(12) United States Patent
Shreiber et al.

(10) Patent No.: US 7,118,612 B2
(45) Date of Patent: Oct. 10, 2006

(54) OXYGEN SEPARATION METHOD UTILIZING AN OXYGEN TRANSPORT MEMBRANE REACTOR

(75) Inventors: Eric Hunter Shreiber, Getzville, NY (US); Bart Antonie van Hassel, Getzville, NY (US); Ravi Prasad, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 193 days.

(21) Appl. No.: 10/747,169

(22) Filed: Dec. 30, 2003

(65) Prior Publication Data

US 2005/0139067 A1    Jun. 30, 2005

(51) Int. Cl.
*B01D 53/22*    (2006.01)
(52) U.S. Cl. ............................ 95/54; 95/39; 95/45; 96/4
(58) Field of Classification Search .................... 95/39, 95/45–55; 96/4–14
See application file for complete search history.

(56) References Cited

U.S. PATENT DOCUMENTS

| | | | | |
|---|---|---|---|---|
| 5,137,547 A | * | 8/1992 | Chretien ........................... 95/55 |
| 5,174,866 A | * | 12/1992 | Chen et al. ................... 205/634 |
| 5,332,424 A | * | 7/1994 | Rao et al. ......................... 95/47 |
| 5,447,555 A | | 9/1995 | Yee et al. ......................... 95/54 |
| 5,516,359 A | | 5/1996 | Kang et al. ...................... 95/14 |
| 5,562,754 A | * | 10/1996 | Kang et al. ...................... 95/54 |
| 5,769,926 A | * | 6/1998 | Lokhandwala et al. ........ 95/39 |
| 5,837,034 A | * | 11/1998 | Keskar et al. ................... 95/54 |
| 5,837,125 A | * | 11/1998 | Prasad et al. ................. 205/763 |
| 5,865,878 A | * | 2/1999 | Drnevich et al. ............... 95/54 |
| 5,888,272 A | * | 3/1999 | Prasad et al. ................... 95/54 |
| 5,935,298 A | | 8/1999 | Prasad et al. ................... 95/39 |
| 5,944,874 A | | 8/1999 | Prasad et al. ................... 95/54 |
| 5,954,859 A | * | 9/1999 | Keskar et al. ................... 95/54 |
| 6,106,591 A | | 8/2000 | Keskar et al. ................... 95/54 |
| 6,273,937 B1 | * | 8/2001 | Schucker ......................... 95/45 |
| 6,293,084 B1 | | 9/2001 | Drenvich et al. ........... 60/39.02 |
| 6,485,545 B1 | * | 11/2002 | Ohlrogge et al. ................. 96/4 |
| 6,537,465 B1 | * | 3/2003 | Gottzmann et al. .......... 252/373 |
| 6,539,719 B1 | | 4/2003 | Prasad et al. .................. 60/649 |

(Continued)

FOREIGN PATENT DOCUMENTS

JP    63-248418 A  *  10/1988

(Continued)

OTHER PUBLICATIONS

Dyer et al., "Ion Transport Membrane Technology For Oxygen Separation And Syngas Production", Solid State Ionics, vol. 34 (2000) pp. 21-33.

*Primary Examiner*—Jason M. Greene
(74) *Attorney, Agent, or Firm*—David M. Rosenblum

(57) ABSTRACT

A method of separating oxygen from an oxygen containing stream in which compressed and heated oxygen is introduced into cathode side of an oxygen transport membrane reactor. Oxygen is permeated from the cathode side to the anode side. Motive fluid that is introduced into an ejector draws an oxygen permeate containing stream from the anode side at a subatmospheric pressure to form an oxygen containing product stream. The motive fluid, which can be steam raised by combustion used in heating the reactor, can be separated from the oxygen containing product stream to form an oxygen product stream. The use of an ejector lowers the partial pressure of the oxygen at the anode side of the membrane reactor and therefore the degree to which the oxygen containing stream need be compressed.

12 Claims, 4 Drawing Sheets

U.S. PATENT DOCUMENTS

| | | | |
|---|---|---|---|
| 6,623,714 B1 * | 9/2003 | Shreiber et al. | 423/219 |
| 6,702,570 B1 * | 3/2004 | Shah et al. | 431/11 |
| 6,709,483 B1 * | 3/2004 | Hodgson, Jr. | 95/51 |
| 2003/0056647 A1 * | 3/2003 | Gottzmann | 95/54 |

FOREIGN PATENT DOCUMENTS

| | | | |
|---|---|---|---|
| JP | 4-122414 A | * | 4/1992 |

* cited by examiner

OXYGEN SEPARATION METHOD UTILIZING AN OXYGEN TRANSPORT MEMBRANE REACTOR

FIELD OF THE INVENTION

The present invention relates to a method of separating oxygen from an oxygen containing gas by use of an oxygen transport membrane reactor. More particularly, the present invention relates to such a method in which an ejector is used to draw oxygen permeate from the oxygen transport membrane reactor at a subatmospheric pressure to form an oxygen containing product stream.

BACKGROUND OF THE INVENTION

Oxygen can be separated from air or other oxygen containing gases with the use of an oxygen transport membrane. Oxygen transport membranes are fabricated from ceramics that exhibit oxygen ion conductivity at elevated temperatures. An oxygen containing feed stream, for instance, air, is passed along one side of the membrane that is designated as a cathode side. At the cathode side of the membrane, the oxygen ionizes by gaining electrons. The oxygen ions pass through the membrane and emerge from the other side of the membrane, designated as the anode side. At the anode side, the oxygen ions release their excess electrons and combine to form elemental oxygen.

In membranes known as mixed conductors, the electrons from the anode side are transported through the membrane to the cathode side where they serve to ionize the oxygen. In other ceramic materials known as ionic conductors, the membrane will solely conduct oxygen ions. External electrodes are therefore placed at the cathode and anode sides of the membrane and a separate electrical pathway is provided for the conduction of electrons. In dual phase conductors, the electrically conducting pathways are applied as a conductive phase within the membrane itself.

The oxygen separation by oxygen transport membranes requires a driving force of oxygen partial pressure. The oxygen partial pressure at the cathode side of the membrane must be higher than the oxygen partial pressure at the anode side of the membrane for the separation to occur. Typically, the driving force is supplied by compression of the incoming oxygen containing feed. Alternatively, or in addition, as disclosed in U.S. Pat. No. 6,539,719 a vacuum may be drawn at the anode side by a vacuum blower/compressor to decrease the oxygen partial pressure at the anode side. Vacuum blowers are also disclosed for such purposes in U.S. Pat. Nos. 5,516,359, 5,447,555 and 5,935,298. Another manner of reducing the partial pressure at the anode side of the membrane is the use of a purge stream to either consume or sweep away permeated oxygen and thereby lower the partial pressure of oxygen at the anode side. Such use of purge gas is shown in U.S. Pat. No. 5,944,874.

As may be appreciated, the more the partial pressure is reduced at the anode side of the membrane, the less the oxygen containing feed stream need be compressed for a particular output of oxygen. However, the use of vacuum pumps consumes electricity and also adds to the expense of the reactor system.

As will be discussed, the present invention provides a method of separating oxygen from an oxygen containing feed in which the partial pressure of the oxygen is reduced at the anode side of the membrane without the use of a vacuum blower and like devices.

SUMMARY OF THE INVENTION

The present invention discloses a method of separating oxygen from an oxygen containing gas stream in which the oxygen containing gas stream is compressed to form a compressed oxygen containing stream. The compressed oxygen containing gas stream is heated and introduced into a cathode side of an oxygen transport membrane reactor to permeate oxygen to an anode side and thereby to form an oxygen depleted retentate and permeated oxygen. A motive fluid is introduced into an ejector to draw the oxygen permeate containing stream from the anode side of the oxygen transport membrane reactor at a subatmospheric pressure and thereby to form an oxygen containing product stream. The use of an ejector to lower the partial pressure on the anode side of the membrane does not consume energy and thereby lowers the total energy input to the separation of the oxygen.

Advantageously, combustion can be supported within at least one stage of combustion with residual oxygen contained within a retentate stream made up of the oxygen depleted retentate. The compressed oxygen containing gas stream is heated at least in part from a portion of the heat generated by the combustion. A steam stream is formed by heating make-up water stream, at least in part, with a further portion of the heat generated by the combustion. A combustion product stream can be expanded with the performance of work. The combustion product stream is discharged from at least the one stage of combustion. The work of the expansion can be applied to the compression of the oxygen containing gas stream to further lower energy expenditures. The motive fluid can be formed at least in part from the steam stream.

The water can be condensed from the oxygen containing product stream to form an oxygen product stream.

The at least one stage of combustion can be a first stage of combustion and a second stage of combustion, sequentially positioned. The compressed oxygen containing gas stream can be heated from the portion of the heat produced in the first stage of combustion. The combustion product stream can be discharged from the second stage of combustion and expanded with the performance of the work. The combustion product stream, as an expansion exhaust stream, indirectly transfers the further portion of the heat to the make-up water stream.

Alternatively, the at least one stage of combustion can be a single stage of combustion and the combustion product stream can be discharged from such single stage of combustion. The compressed oxygen containing gas stream can be heated from the portion of the heat generated in the single stage of combustion. The combustion product stream is expanded with the performance of work and the combustion product stream, as an expansion exhaust stream, indirectly transfers the further portion of the heat to the make-up water stream.

In another alternative, the at least one stage of combustion can be a first stage of combustion and a second stage of combustion. The compressed oxygen containing gas stream is fully heated through the portion of the heat generated in the first stage of combustion by direct firing. The compressed oxygen containing gas stream is partly heated through indirect heat exchange with a retentate stream made up of oxygen depleted retentate. The retentate stream after having indirectly exchanged heat with the compressed oxygen containing gas stream is introduced into the second stage of combustion to support the combustion taking place therein. The combustion product stream is discharged from the second stage of combustion and expanded with the performance of the work.

In a further aspect of the present invention, the at least one stage of combustion can be a first stage of combustion, a second stage of combustion and a third stage of combustion. The compressed oxygen containing gas stream is partly heated from the portion of the heat that is produced in the first stage of combustion. The combustion product stream is discharged from the second stage of combustion and is expanded with a performance of work. The combustion product stream, as an expansion exhaust stream, indirectly transfers the further heat to the make-up water stream. The compressed oxygen containing stream is fully heated in the third stage of combustion supported by a portion of the oxygen content within the compressed oxygen containing stream by direct firing.

In yet still a further aspect of the present invention, the combustion can be supported with residual oxygen contained within a retentate stream made up of oxygen depleted retentate in a first combustion stage, a second combustion stage, and a third combustion stage, that are sequentially positioned with respect to one another. The compressed oxygen containing gas stream is heated by a portion of the heat produced in the first stage of combustion. A first combustion product stream is expanded with the performance of work. The first combustion product stream is discharged from the second stage of combustion. The work of expansion is applied to the compression of the oxygen containing gas stream. The first combustion product stream is introduced as an expansion exhaust stream into the third stage of combustion. A second combustion product stream is discharged from the third stage of combustion. A steam stream is formed by heating make-up water stream with additional heat generated by the third stage of combustion and the steam stream is introduced into the ejector as the motive fluid.

In a yet still further aspect of the present invention, the at least one stage of combustion can be a first stage of combustion and a second stage of combustion, sequentially positioned. The compressed oxygen containing gas stream is heated by a portion of the heat produced in the first stage of combustion. The combustion product stream is discharged from the second stage of combustion and indirectly transfers the further heat to the make-up water stream to produce the steam stream. After having transferred heat to the make-up water stream, the combustion product stream is expanded with the performance of the work.

In an alternative aspect of the present invention, the at least one stage of combustion can be a first stage of combustion and a second stage of combustion. The compressed oxygen containing gas stream, followed by the make-up water stream are heated by a portion of the heat produced in the first stage of combustion. The combustion product stream is discharged from the second stage of combustion and is expanded with the performance of the work.

In any embodiment of the present invention, an additional steam stream may be added to the steam stream to form the motive fluid. It is to be noted that the heat contained in an additional process stream may be used to heat the make-up water to produce additional steam. In this regard, the additional process stream may be the stream that is discharged from an industrial combustion process, such as a glass melting furnace. Further, in any embodiment, a heated purge stream can be introduced into the anode side of the oxygen transport membrane reactor and the oxygen permeate containing stream can be cooled prior to the ejector. The purge stream can be an additional steam stream.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

In order to avoid repetition in the explanation of the Figures, the same reference numbers for elements shown in the Figures where the description of such elements from figure to figure remained the same.

DETAILED DESCRIPTION

Figure 1:
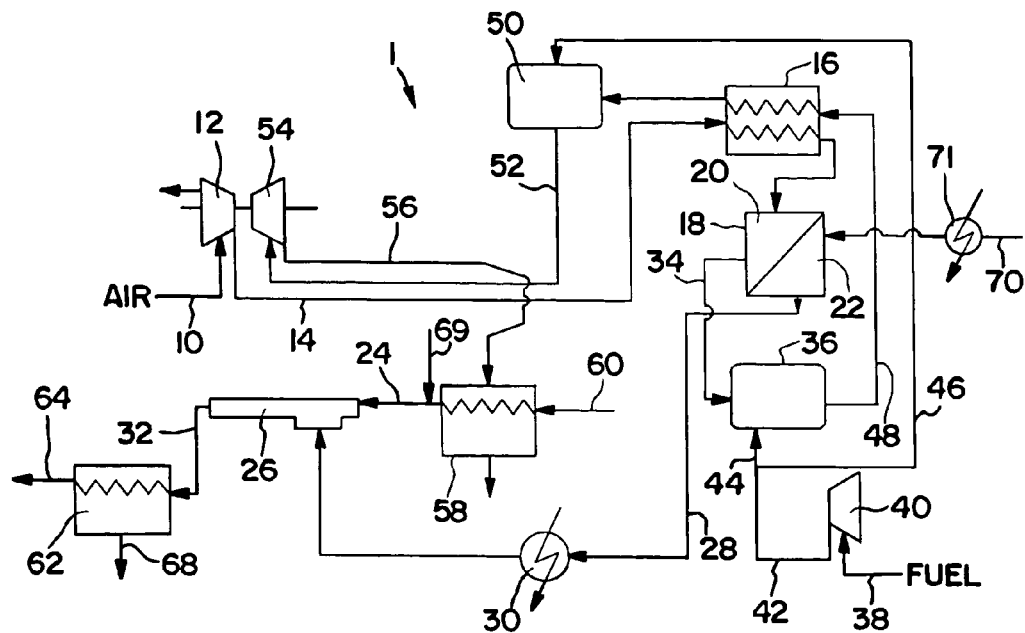
FIG. 1 is an oxygen separation system for carrying out a method in accordance with the present invention.

With reference to FIG. 1, an oxygen separation system 1 is illustrated in which an oxygen containing stream 10 composed of air is compressed by a compressor 12 to a pressure of between about 18 psia and about 500 psia and preferably between 50 psia and 150 psia. The compression forms a compressed oxygen containing stream 14 that is heated in a heat exchanger 16 to a temperature from between about 600° C. and about 1000° C. After having been heated, the compressed oxygen containing stream 14 is introduced into an oxygen transport membrane reactor 18 having one or more oxygen transport membranes that each have a cathode side 20 and an anode side 22. Heated oxygen containing stream 14 heats the oxygen transport membrane reactor and oxygen is permeated to anode side 22 to form permeated oxygen and an oxygen depleted retentate. A motive fluid 24 is introduced into an ejector 26 to draw an oxygen permeate containing stream 28 from anode side 22 of oxygen transport membrane reactor 20 at a subatmospheric pressure. The motive fluid 24 creates a low pressure region within ejector 26 to produce the subatmospheric pressure. Preferably, the oxygen permeate containing stream 28 can be cooled in a product cooler 30 prior to being drawn into ejector 26. It is to be noted that the oxygen containing permeate stream 28 is cooled within product cooler to a temperature of between about 400° C. and about 550° C. Further, the discharge pressure of ejector 26 may be anywhere from about ambient pressure to about 50 psia.

A combined motive fluid and oxygen permeate containing stream is discharged from ejector 26 to form an oxygen containing product stream 32. Since ejector 26 is drawing the oxygen permeate stream from the anode side, there is less partial pressure of oxygen on the anode side of oxygen transport membrane reactor 18 to thereby, in itself, lower the compression requirements for compressor 12. Practically, the anode side 22 of oxygen transport membrane reactor 18 will be at a pressure of between 0.01 psia and about 13 psia and the permeated oxygen will have a purity that is ideally above 99 mole percent.

Having generally described the embodiment of FIG. 1, a more detailed description begins with the heating of oxygen containing stream 14. A retentate stream 34 is introduced into a combustor 36 in which a first stage of combustion takes place. Retentate stream 34 is composed of the oxygen depleted retentate produced by the permeation of oxygen from the cathode side 20 to the anode side 22 and therefore contains residual oxygen to support combustion. A fuel gas stream 38 is compressed within a compressor 40 to a pressure between about 20 and about 500 psia to produce a compressed fuel stream 42 that is divided into first and second subsidiary fuel streams 44 and 46. First subsidiary fuel stream 44 is introduced into combustor 36 to produce a heated combustion stream 48 that is introduced into heat exchanger 16 and then into a second stage of combustion provided by a combustor 50. The remaining oxygen contained within heated combustion stream 48 is used to support combustion of second subsidiary fuel stream 46 to produce a combustion product stream 52 that has a temperature of anywhere from between about 400° C. and about 700° C.

Combustion product stream is introduced into an expander 54 where it is expanded with a performance of work. Thereafter the combustion product stream, as an expansion exhaust stream 56, is introduced into a boiler 58 to heat a make-up water stream 60 and thereby form the motive fluid stream 24 which is a steam stream. Expansion exhaust stream 56 may have a pressure from between about 50 psia and about 30 psia and a temperature from between about 150° C. and about 350° C.

As is readily apparent from FIG. 1, the heat of combustion produced by combustors 36 and 50 is in part used to heat the incoming air, to create a motive fluid for ejector 26 by transferring a further part of the heat to the make-up water stream 60 and to raise the temperature of a feed of expander 54. It is to be noted that work of expansion can be applied to the compression of compressor 12 and also possibly compressor 40. Hence, the further heat that is transferred to make-up water stream 60 is also being used to lower the partial pressure on the anode side 22 of oxygen transport membrane reactor 18, thereby to recover heat that would otherwise be lost from the system.

In the illustrated embodiment, heated combustion stream 48 is used as a heat transfer media to heat the incoming compressed oxygen containing stream 14 within heat exchanger 16. However, it is understood that heat exchanger 16 and combustor 36 could be combined so that the combustion itself indirectly heated incoming compressed oxygen containing stream 14. The heated combustion stream 48 would then be introduced into combustor 50.

Although oxygen containing product stream 32 can be used by itself in subsequent processes requiring oxygen and steam mixtures, conveniently, such in containing product stream 32 can be cooled within a condenser 62 to condense out the water and thereby form an oxygen product stream 64. The condensed water can be discharged as a water stream 68 that is used in forming make-up water stream 60.

Product stream 64 can be fed into a blower or a product compressor to raise the pressure of oxygen product stream to anywhere from between 2 and 800 psia. Moreover, prior to an oxygen compressor or blower oxygen product stream 64 can be further dried.

Optionally, a supplementary steam stream 69 can be added to motive fluid stream 24 to increase the suction at the anode side 22 of oxygen transport membrane reactor 18. Alternatively, or in addition, the heat contained within an additional process stream may be introduced to boiler 58 in order to increase the production of steam 24. A further option is the use of an external purge stream 70, heated within a heater 71 and introduced to the anode side 22 of oxygen transport membrane reactor 18. Purge stream 70 can be inert, for instance, steam or carbon dioxide, or reactive, for example, natural gas, hydrogen or process syngas. A diluent air purge is also possible for the purge stream 70. All of such purges lower the partial pressure of the oxygen on the anode side 22 of oxygen transport membrane reactor 18 and thereby also lower the amount of compression required for air stream 10. The disadvantage of many of such streams is that a further separation step can be required depending on the use of product stream 64. As can be appreciated, the use of supplementary steam stream 69 and/or additional process stream and/or external purge stream 70 has equal applicability to any embodiment of the present invention.

Figure 2:
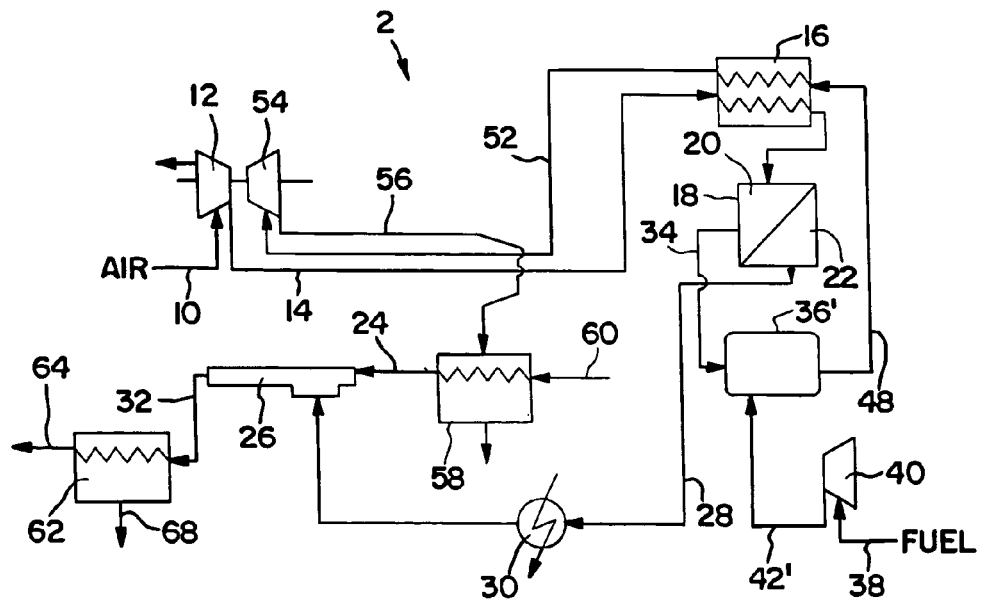
FIG. 2 is an alternative embodiment of FIG. 1 utilizing a single stage of combustion.

With reference to FIG. 2, an oxygen separation system 2 is shown that utilizes a single stage of combustion that is provided by a combustor 36'. Since only a single stage of combustion is used, a single compressed fuel stream 42' is fed directly into combustor 36'. Thus, a portion of the heat created through such combustion serves to heat the incoming compressed oxygen containing stream 14 and a further portion of the heat remaining after expansion is being used to heat the make-up water stream 60 into steam to form the motive fluid stream 24. This is accomplished with the use of heated combustion stream 48 which in such embodiment is the combustion product stream. The advantage of such an embodiment is the cost savings involved in utilizing a single combustor.

Figure 3:
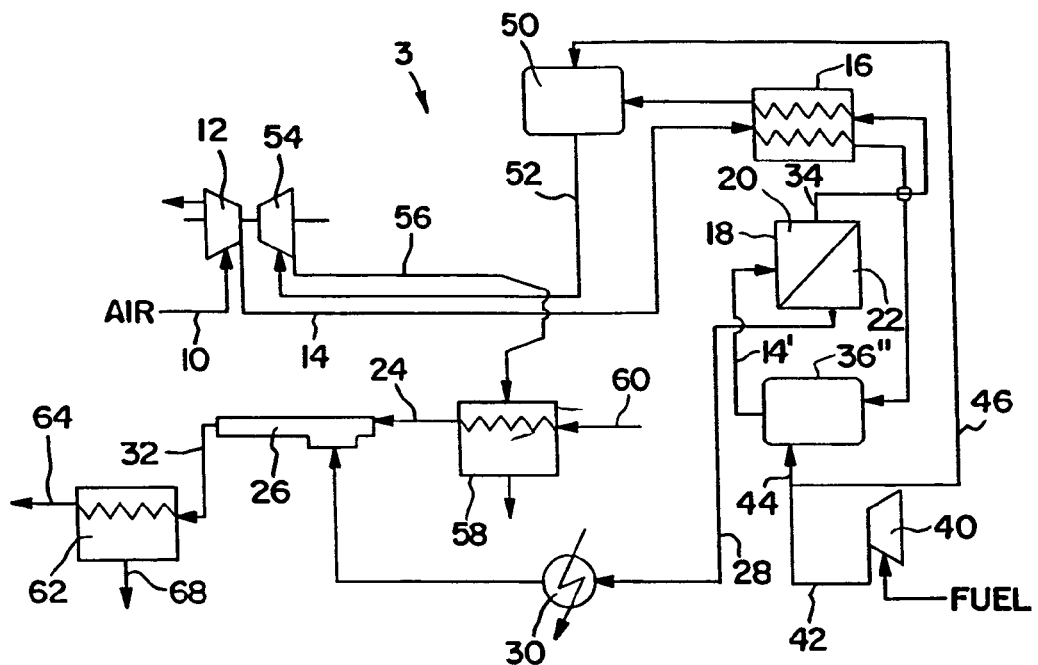
FIG. 3 is an alternative embodiment of FIG. 1 employing direct firing in a first of two stages of combustion to heat the incoming compressed oxygen containing gas stream.

With reference to FIG. 3, an oxygen separation system 3 is shown in which compressed oxygen containing stream 14 is introduced into a first stage of combustion that is provided by combustor 36'' and is therefore fully heated by direct firing from a portion of the heat produced from the combustion. The heated compressed oxygen containing gas stream 14' is then introduced to the cathode side 20 of oxygen transport membrane reactor 18. A retentate stream 34 is introduced into heat exchanger 16 to partially heat the incoming compressed oxygen containing stream 14 and then into a second stage of combustion provided by a combustor 50 to produce the combustion product stream 52. The embodiment illustrated in FIG. 3 is otherwise the same as that shown in FIG. 1 and as such, further heat from the combustion remaining after the expansion is used to heat the make-up water to boiler 58. The advantage of such an embodiment is that heat exchanger 16 may be operated at a lower temperature while still maximizing power recovery.

Figure 4:
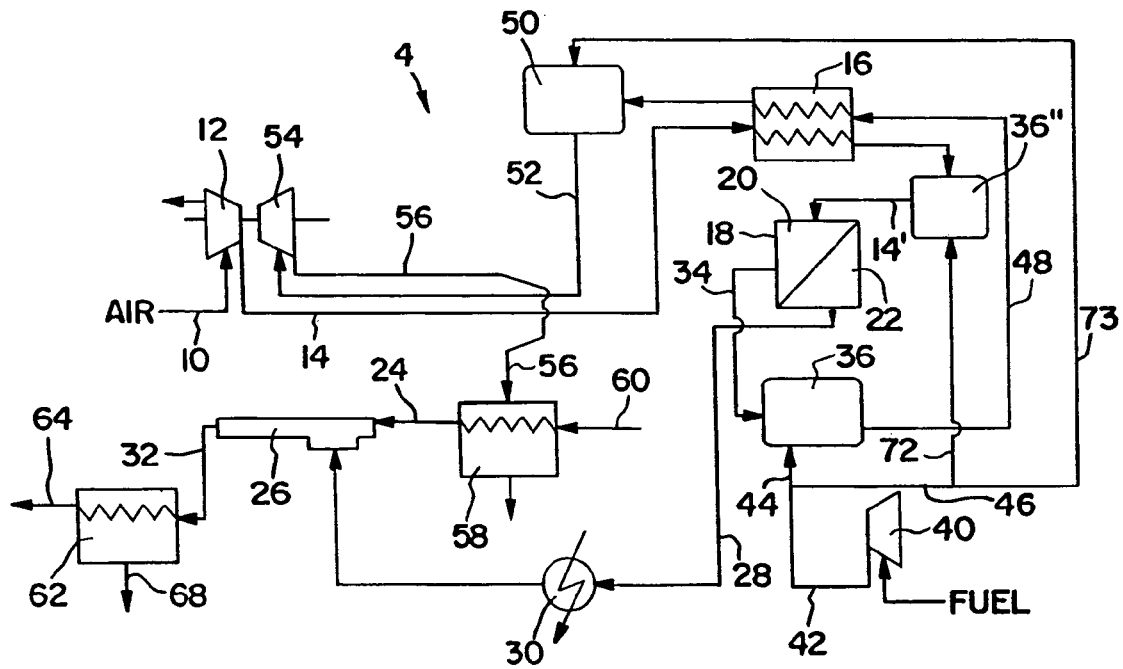
FIG. 4 is a further alternative embodiment of FIG. 1 employing three stages of combustion in which the first stage is used to fully heat the compressed oxygen containing gas stream.

With reference to FIG. 4, an oxygen separation system 4 is illustrated that employs direct firing of compressed oxygen containing stream 14 within a third stage of combustion provided by combustor 36'' to fully heat the compressed oxygen containing stream 14. The combustion produces a heated compressed oxygen containing stream 14' that is introduced into oxygen transport membrane reactor 18 to produce retentate stream 34. Retentate stream 34 is fed into the first stage of combustion 36. The resultant heated combustion stream 48 is fed into heat exchanger 16 to partly heat the compressed oxygen containing stream 14 and is then fed to the second stage of combustion 50. In order to support combustion within combustor 36", a first part 72 of the second subsidiary fuel stream is fed into combustor 36" while a second part 73 is fed into combustor 50. The advantage of such an embodiment is the thermal decoupling of heat exchanger 16, expander 54, and oxygen transport membrane reactor 18.

Figure 5:
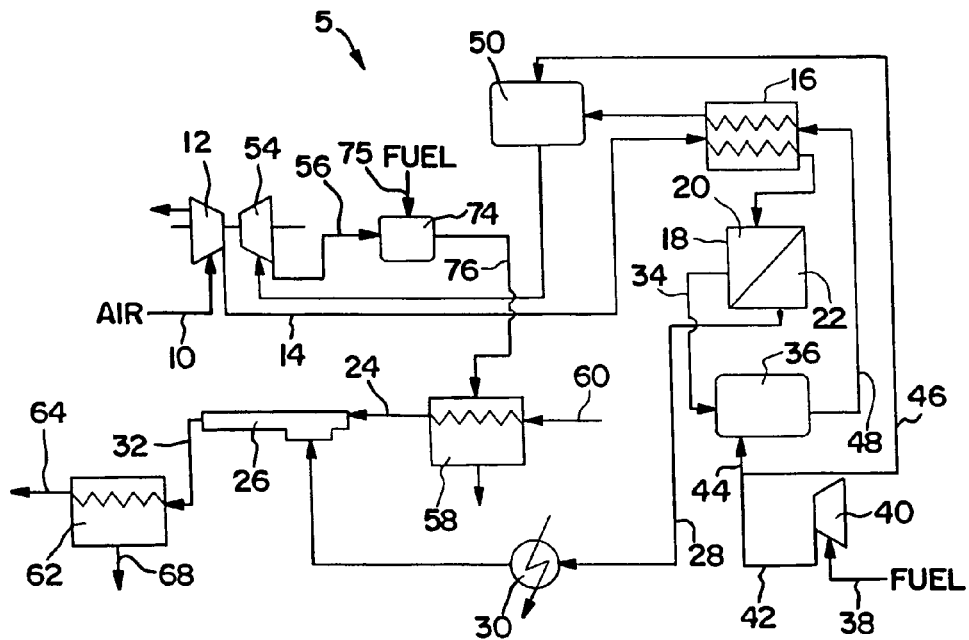
FIG. 5 is yet a further alternative embodiment of FIG. 1 employing three stages of combustion in which an expander exhaust is reheated by direct firing in a third combustion stage.

With reference to FIG. 5, an oxygen separation system 5 is illustrated that constitutes a further modification of the embodiment of FIG. 1. In oxygen separation system 5, a third stage of combustion is provided by a combustor 74 that heats expansion exhaust stream 56. In this regard, a fuel stream 75 is introduced into combustor 74 to form a second combustion product stream 76 that is used to heat make-up water stream 60 within boiler 58. The advantage of such an embodiment is the thermal decoupling of heat exchanger 16, expander 54, and boiler 58.

Figure 6:
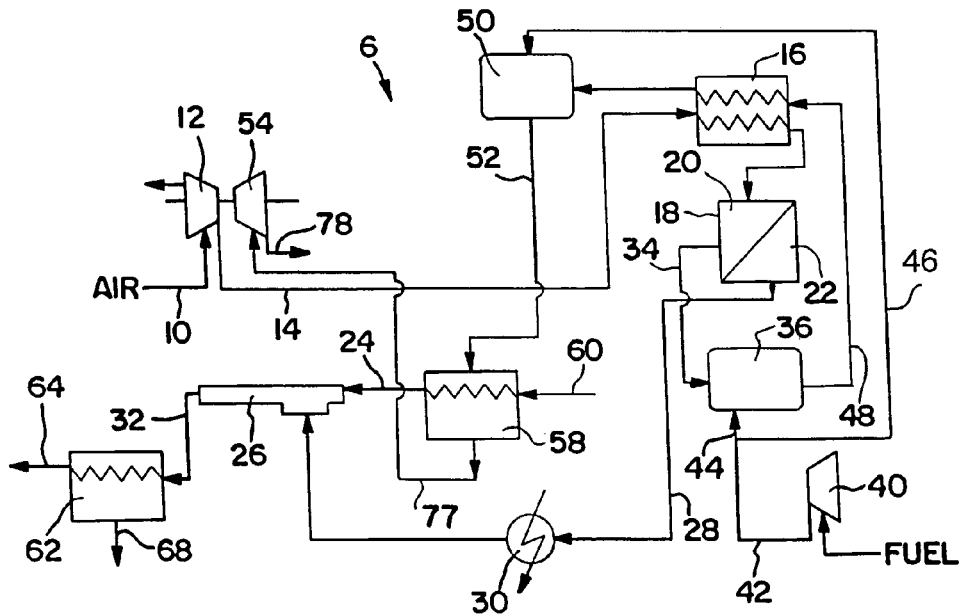
FIG. 6 is an alternative embodiment of FIG. 1 in which a combustion product stream from a second of two stages of combustion is used to heat boiler make-up water to form a steam containing motive fluid for an ejector.

With reference to FIG. 6, an oxygen separation system 6 is shown that is an alternative to the embodiment of FIG. 1. In such embodiment, combustion product stream 52 serves as a feed to boiler 58 to produce a cooled combustion product stream 77 that serves as the feed to expander 54 and thereby produce an exhaust stream 78.

Figure 7:
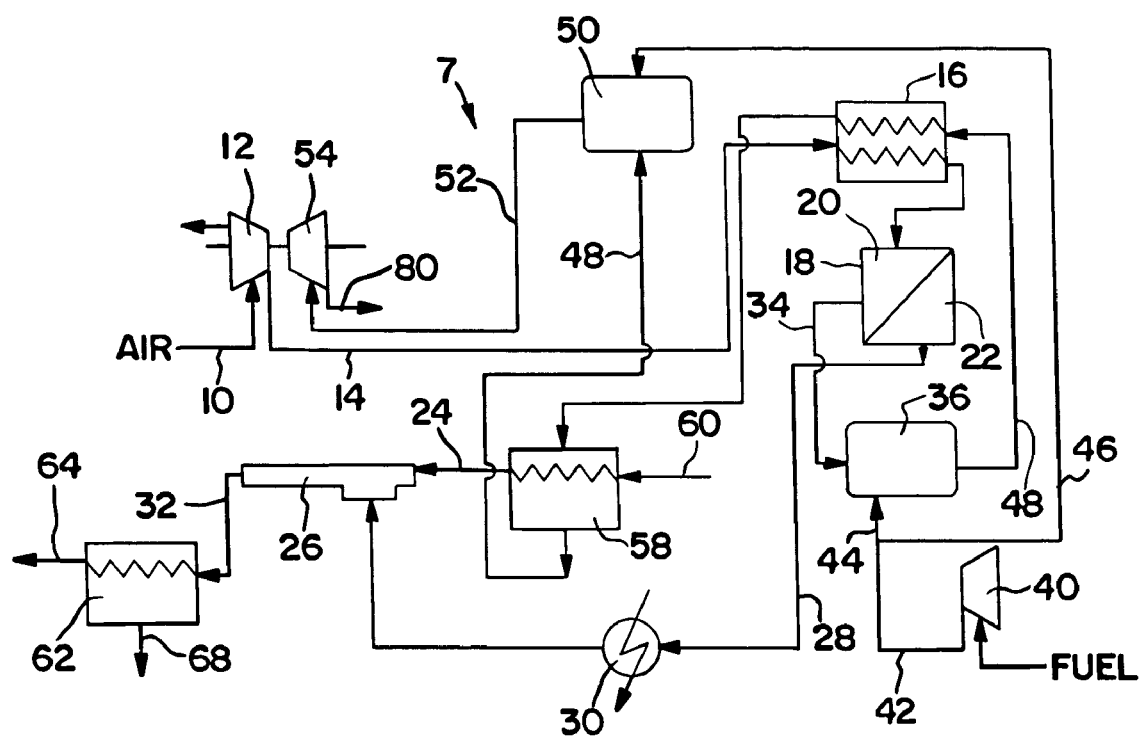
FIG. 7 is an alternative embodiment of FIG. 1 in which a combustion product stream from a first of two stages of combustion is used to heat boiler make-up water to form a steam containing motive fluid for an ejector.

With reference to FIG. 7, an oxygen separation system 7 is illustrated that constitutes a modification of the embodiment of FIG. 1. In oxygen separation system 7, after heated combustion stream 48 has been introduced into heat exchanger 16 to heat the incoming compressed oxygen containing gas stream 14, it is introduced into boiler 58, where it is cooled further. The cooled combustion stream 48 is introduced into the second stage of combustion provided by combustor 50 to produce combustion product stream 52 which is used as a feed to expander 54 to thereby also produce an exhaust stream 80. The advantage of such embodiment is the decoupling of boiler 58 with expander 54.

While the present invention has been described with reference to preferred embodiments, as will occur to those skilled in the art, numerous changes, additions and omissions may be made without departing from the spirit and scope of the present invention as recited in the presently pending claims.

We claim:

1. A method of separating oxygen from an oxygen containing gas stream comprising:
    compressing the oxygen containing gas stream to form a compressed oxygen containing gas stream;
    heating said compressed oxygen containing gas stream;
    introducing said compressed oxygen containing gas stream after having been heated into a cathode side of an oxygen transport membrane reactor to permeate oxygen to an anode side and thereby to form an oxygen depleted retentate and permeated oxygen;
    supporting combustion within at least one stage of combustion with residual oxygen contained within a retentate stream made up of the oxygen depleted retentate;
    the compressed oxygen containing gas stream being heated at least in part from a portion of the heat generated by the combustion;
    introducing a motive fluid into an ejector to draw an oxygen permeate containing stream from said anode side of said oxygen transport membrane reactor at a subatmospheric pressure and thereby to form an oxygen containing product stream;
    forming a steam stream by heating a make-up water stream at least in part with a further portion of the heat generated by the combustion;
    expanding a combustion product stream with performance of work, the combustion product stream being discharged from the at least one stage of combustion,
    applying said work to the compression of the oxygen containing gas stream; and
    forming the motive fluid at least in part from the steam stream.

2. The method of claim 1, wherein water is condensed from said oxygen containing product stream to form an oxygen product stream.

3. The method of claim 1, wherein:
    the at least one stage of combustion is a first stage of combustion and a second stage of combustion, sequentially positioned;
    the compressed oxygen containing gas stream is heated from the portion of the heat produced in the first stage of combustion;
    the combustion product stream is discharged from the second stage of combustion and is expanded with the performance of the work; and
    the combustion product stream, as an expansion exhaust stream, indirectly transfers the further portion of the heat to the make-up water stream.

4. The method of claim 1, wherein:
    the at least one stage of combustion is a single stage of combustion;
    the combustion product stream is discharged from the single stage of combustion;
    the compressed oxygen containing gas stream is heated from the portion of the heat generated in the single stage of combustion;
    the combustion product stream is expanded with the performance of the work; and
    the combustion product stream, as an expansion exhaust stream, indirectly transfers the further portion of the heat to the make-up water stream.

5. The method of claim 1, wherein:
    the at least one stage of combustion is a first stage of combustion and a second stage of combustion;
    the compressed oxygen containing gas stream is fully heated through the portion of the heat generated in the first stage of combustion by direct firing;
    the compressed oxygen containing gas stream is partly heated through indirect heat exchange with a retentate stream made up of oxygen depleted retentate;
    the retentate stream after having indirectly exchanged heat with the compressed oxygen containing gas stream is introduced into the second stage of combustion to support the combustion taking place therein; and
    the combustion product stream is discharged from the second stage of combustion and expanded with the performance of the work.

6. The method of claim 1, wherein:
    the at least one stage of combustion is a first stage of combustion, a second stage of combustion and a third stage of combustion;
    the compressed oxygen containing gas stream is partly heated from the portion of the heat produced in the first stage of combustion;
    the combustion product stream is discharged from the second stage of combustion and is expanded with the performance of the work;

the combustion product stream, as an expansion exhaust stream, indirectly transfers the further heat to the make-up water stream; and the oxygen containing stream is fully heated in the third stage of combustion supported by a portion of the oxygen content within the compressed oxygen containing stream by direct firing.

7. A method of separating oxygen from an oxygen containing gas stream, comprising:

compressing the oxygen containing gas stream to form a compressed oxygen containing gas stream;

heating said compressed oxygen containing gas stream;

introducing said compressed oxygen containing gas stream after having been heated into a cathode side of an oxygen transport membrane reactor to permeate oxygen to an anode side and thereby to form an oxygen depleted retentate and permeated oxygen;

introducing a motive fluid into an ejector to draw an oxygen permeate containing stream from said anode side of said oxygen transport membrane reactor at a subatmospheric pressure and thereby to form an oxygen containing product stream supporting combustion with residual oxygen contained within a retentate stream made up of the oxygen depleted retentate in a first stage of combustion, a second stage of combustion, and a third stage of combustion, sequentially positioned;

the compressed oxygen containing gas stream being heated by a portion of the heat produced in the first stage of combustion;

expanding a first combustion product stream with performance of work, the first combustion product stream being discharged from the second stage of combustion;

applying the work of the expansion to the compression of the oxygen containing gas stream;

introducing the first combustion product stream as an expansion exhaust stream into the third stage of combustion;

discharging a second combustion product stream from the third stage of combustion;

forming a steam stream by heating a make-up water stream with additional heat generated in the third stage of combustion; and introducing the steam stream into the ejector as the motive fluid.

8. The method of claim 1, wherein:

the at least one stage of combustion is a first stage of combustion and a second stage of combustion, sequentially positioned;

the compressed oxygen containing gas stream is heated by a portion of the heat produced in the first stage of combustion;

the combustion product stream is discharged from the second stage of combustion;

the combustion product stream indirectly transfers the further heat to the make-up water stream to produce the steam stream; and after having transferred heat to the make-up water stream, the combustion product stream is expanded with the performance of the work.

9. The method of claim 1, wherein:

the at least one stage of combustion is a first stage of combustion and a second stage of combustion;

the compressed oxygen containing gas stream, followed by the make-up water stream are heated by a portion of the heat produced in the first stage of combustion; and the combustion product stream is discharged from the second stage of combustion and is expanded with the performance of the work.

10. The method of claim 1, wherein an additional steam stream is added to the steam stream to form the motive fluid.

11. The method of claim 1, wherein:

a heated purge stream is introduced into the anode side of the oxygen transport membrane reactor; and the oxygen permeate containing stream is cooled prior to the ejector.

12. The method of claim 11, wherein the purge stream is an additional steam stream.

* * * * *